UNITED STATES PATENT OFFICE.

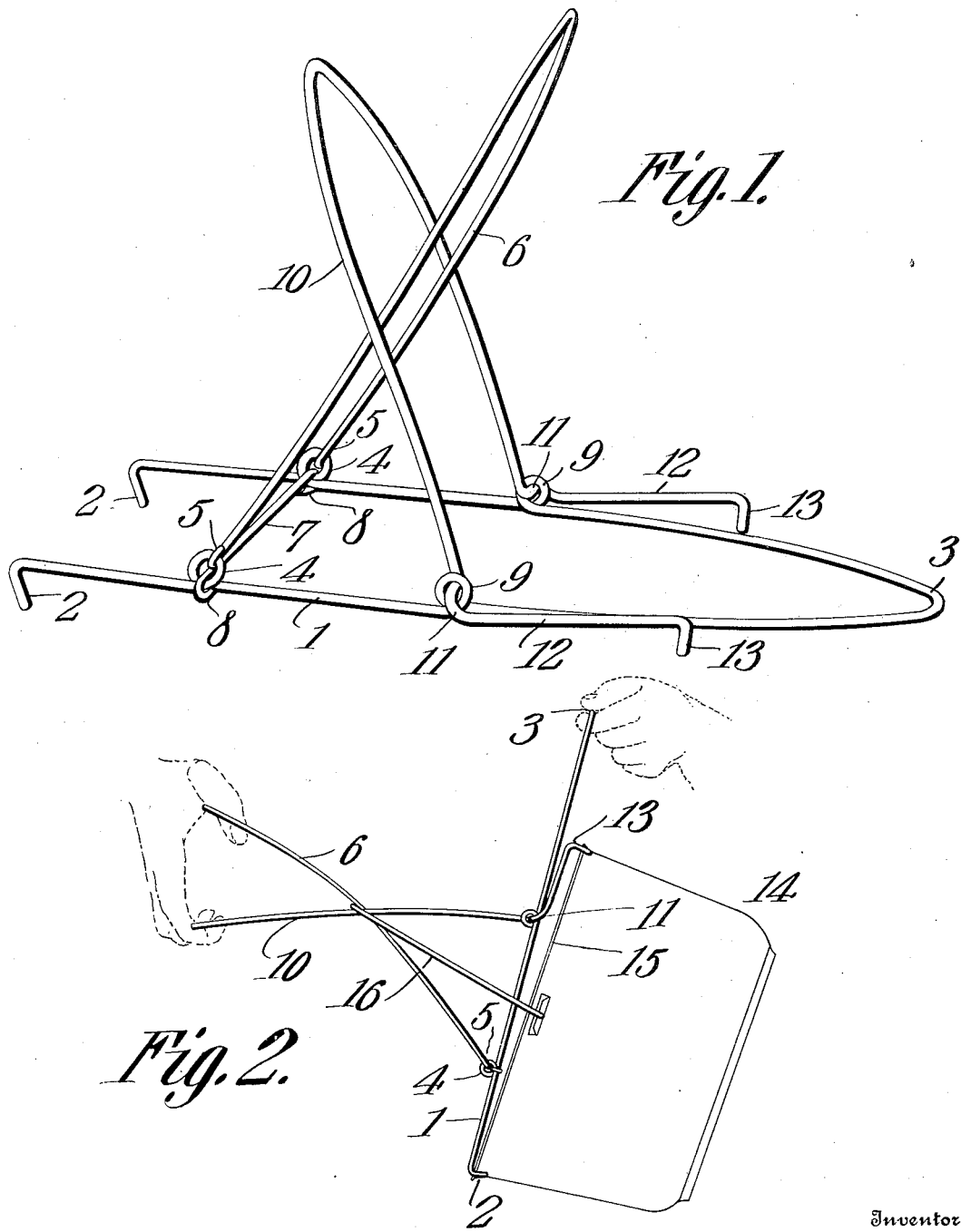

ELYSA MOUSSEAU, OF GREEN BAY, WISCONSIN.

KETTLE-TILTER.

No. 897,477.  Specification of Letters Patent.  Patented Sept. 1, 1908.

Application filed April 20, 1908. Serial No. 428,205.

*To all whom it may concern:*

Be it known that I, ELYSA MOUSSEAU, a citizen of the United States, residing at 717 Main street, Green Bay, in the county of Brown and State of Wisconsin, have invented a new and useful Kettle-Tilter, of which the following is a specification.

This invention relates to devices adapted in conjunction with the bail or handles of a kettle to aid in lifting and tilting the kettle. Such devices are generally constructed of wire, with a member formed to extend over and engage the top of a kettle, and provided with a pair of hinged members adapted to interlock with the handle of the kettle, and with the main member serving as bails to raise and hold a kettle in tilted position. By means of such devices a kettle containing water and vegetables or other food which has been cooked therein may be lifted with one hand, and tilted with the other, thereby enabling the kettle to be drained without scalding the hands.

The invention consists of an improved device of this character constructed and arranged as hereinafter set forth and claimed.

Referring to the drawing: Figure 1, is a perpsective view of a kettle lifting and tilting appliance constructed in accordance with this invention. Fig. 2, is a side view, showing the device in use with a tilted kettle.

In carrying out this invention, it consists of a main member 1, formed of wire, with an oblong U or V shape adapted to extend over the top of a kettle as shown in Fig. 2. The main member 1, is formed with the bent or hook ends 2, and with the curved or V shaped end 3, serving as a bail or handle, as hereinafter explained. The member 1, is further formed with the bent loops 4, serving as eyes to which are hinged the bent ends 5, of a V shaped bail or handle 6. The member 1, is braced by a cross wire 7 having its bent ends 8, engaging the loops 4. The main member 1, is also formed about midway between its ends with bent loops 9, in which are hinged a bail or handle 10, the lower portion of said bail 10, being bent at an angle and extending through loops 9 and then curved as at 11, to form hinges with the loops 9, and then extending at an angle to the upper portion of bail 10, to form arms 12, terminating in bent ends, or hooks 13.

The device is used as follows: The main member 1, is laid across the top of a kettle 14, with the hooks 2, engaging the rim 15, of the kettle. The bail 6 is moved through the bail 10 to the position shown in Fig. 1, and the bail 16 of the kettle having been swung over the bail 10, is clamped between the bails 10, and 6 and by taking hold of bails 10 and 6 with one hand, and the bail 3 with the other, with the hooks 2 and 3 in engagement with the rim 15 of the kettle, the latter may be tilted and held in tilted position as shown in Fig. 2.

It will be seen that with a device constructed and arranged as hereinbefore set forth the kettle will be securely and steadily held by the device without danger of slipping and can be easily tilted. The device can also be easily and readily attached to and be detached from a kettle.

What I claim is:

1. A kettle lifting and tilting device comprising a main bail shaped frame adapted to lie across and extend beyond the edge of a kettle top, the ends of the frame terminating in kettle engaging hooks, and intermediate portions of both legs of the frame being bent to form eyes, and a pair of bails pivotally connected to said eyes and arranged to cross each other to form a clamp for the handle of the kettle, the end portions of one of said bails being extended and terminating in kettle rim engaging hooks.

2. A kettle lifting and tilting device comprising a main bail shaped frame arranged to extend across the top of a kettle and provided with terminal hooks for engaging the kettle rim, intermediate portions of both legs of the frame being bent to form eyes, a cross brace connecting two of the eyes near the open end of the frame, and a pair of kettle handle engaging bails pivoted to said eyes and arranged to cross each other, one of said bails having its ends rearwardly extended and terminating in kettle rim engaging hooks.

In testimony that I claim the foregoing as my own, I have hereto affixed my signature in the presence of two witnesses.

ELYSA MOUSSEAU.

Witnesses:
 H. O. SCHAEFER,
 G. BONG.